Jan. 17, 1956    M. S. BLATTNER    2,730,817
APPARATUS FOR COMPARING AND ANALYZING HANDWRITING
Filed Aug. 9, 1954
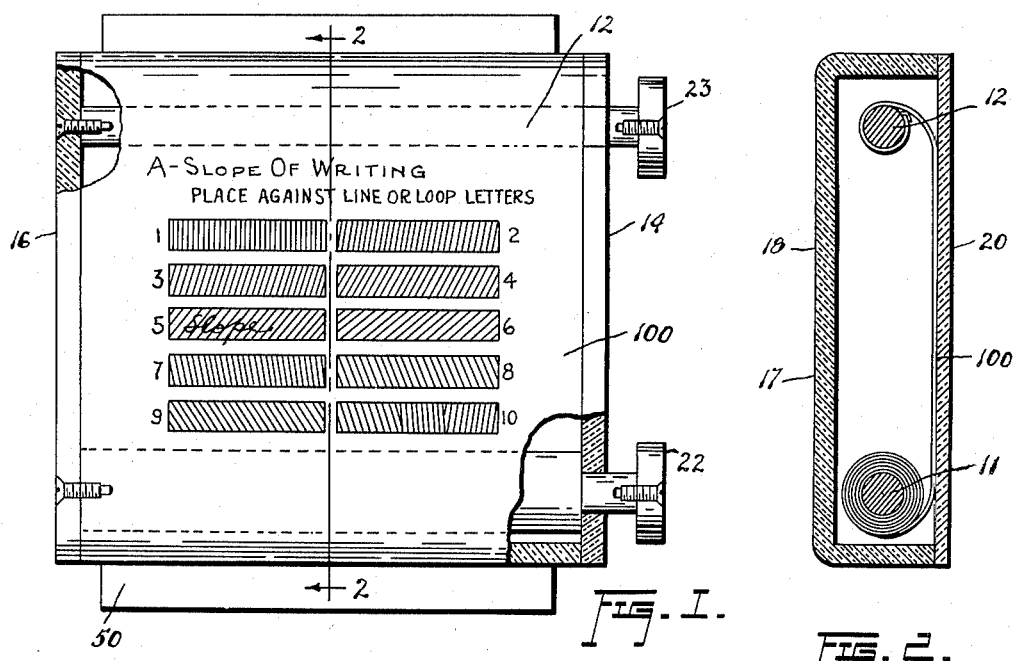
FIG. 1.
FIG. 2.
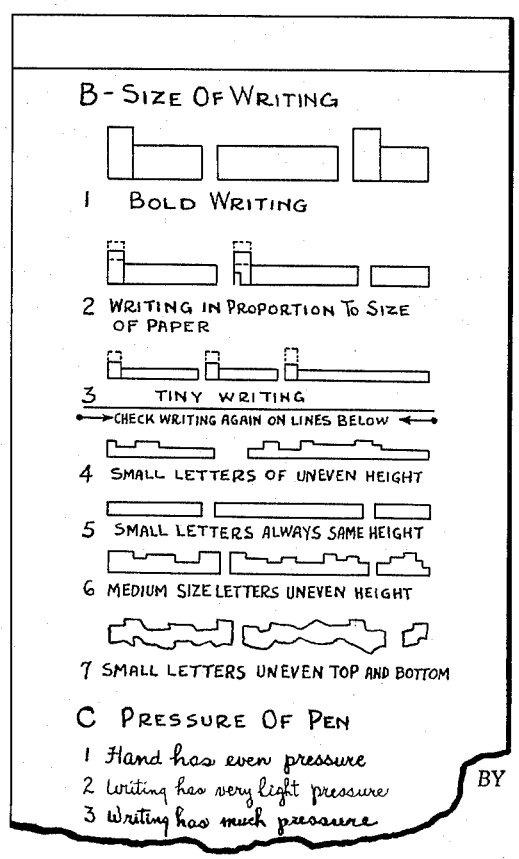
FIG. 3.
INVENTOR
Meyer Stuart Blattner
BY
ATTORNEY

United States Patent Office 2,730,817
Patented Jan. 17, 1956

2,730,817

APPARATUS FOR COMPARING AND ANALYZING HANDWRITING

Meyer Stuart Blattner, Baltimore, Md.

Application August 9, 1954, Serial No. 448,698

3 Claims. (Cl. 35—36)

The invention relates to apparatus designed particularly for comparing and analyzing handwriting, fingerprints and the like, but is also adaptable for other uses.

More particularly my improved apparatus comprises a supporting frame for a pair of spaced spools which carry a length of transparent film material having thereon various marks, such as handwriting specimens, graphs, charts, fingerprints or the like, which are to be used as standards of comparison for handwriting, fingerprints, etc., which are placed below the transparent film and which may be seen through the film and compared with the graphs, handwriting, charts, fingerprints or other standards of comparison appearing on the film. It will be understood that the film may be initially wound principally on one of the rolls and will gradually be unwound from the first roll onto the second roll in order to bring various portions of the film into the space between the rolls for comparison purposes. After the film has been wound upon the second roll it may be returned to the first roll by suitable manipulation of the rolls to reverse the direction of movement of the film.

The invention will be more readily understood by reference to the accompanying drawings and the following detailed description in which a specific embodiment of the invention is set forth by way of illustration rather than by way of limitation.

In the drawings:

Fig. 1 is a plan view of my comparing and analyzing device placed over a sheet having thereon handwriting, fingerprints or the like to be compared or analyzed;

Fig. 2 is a vertical section on line 2—2 of Fig. 1; and

Fig. 3 is a plan view of another portion of the film than that displayed in Fig. 1.

Referring in detail to the drawings, reference numeral 100 denotes a film of transparent material such as plastic or fiberglass having thereon suitable markings, legends, or the like such as specimens of handwriting, graphs, and fingerprints to be used as standards of comparison. As shown in Figs. 1 and 2 one end of the film 100 is secured to a first roller 11 about which most of the film is shown as being initially wound, while the other end of the film is secured to a second roller 12 spaced therefrom. The two rollers 11 and 12 are shown as rotatably mounted inside frame members 14 and 16 forming part of a suitable box or housing 17 having transparent front and rear window portions 18 and 20 so that it is possible to look through the apparatus from front to rear. If desired the entire housing may be of any suitable transparent material as shown, such as glass, "Plexiglas" or the like, or the housing may be made principally of opaque material such as wood, with front and rear openings which may be covered with transparent material, or it will be possible to leave the front and rear openings uncovered, though a transparent covering is desirable to prevent dirt or dust from accumulating on the transparent film 100.

As shown the spools 11 and 12 are provided with knobs or hand wheel portions 22, 23, respectively, permitting the film to be wound from one spool to the other. In Figs. 1 and 2 the major portion of the film is shown wound on the spool 11 and only a small part on spool 12. By turning the knob or hand wheel 23 in the proper direction the film may be wound from spool 11 onto the spool 12. By turning the knob or hand wheel 22 in the proper direction the film may be rewound onto the spool 11.

The markings on the transparent film 100 may be of any suitable character. As shown in Figs. 1 and 3 the markings are arranged in groups with suitable headings to indicate various characteristics of the handwriting or other material to be compared or examined. These headings, which are illustrative only, appear as follows:

A—Slope of writing
B—Size of writing
C—Pressure of pen

Under these various headings examples for comparison purposes are indicated. Thus, under heading "A—Slope of handwriting," there are shown ten examples of various slopes to be compared listed as 1 to 10, inclusive. The particular example which is closest to the handwriting to be compared will be placed over the handwriting appearing on a sheet below the comparing device, and the number on the chart will be noted, thereby ascertaining this particular characteristic of the handwriting.

Similarly, under heading B there will be found various sizes of handwriting, seven such sizes and types being indicated under this heading.

Under "C—Pressure of pen," various examples are indicated, three only being shown below the broken portion at the bottom of Fig. 3. It will be understood that the examples given are illustrative only and that the portion of the film wound upon one or the other of the two spools 11 and 12 will contain many examples beyond those herein described as illustrative.

The operation of the device will be largely apparent from the foregoing description. In use the frame or housing 17 carrying the spools 11 and 12 with the film 100 thereon is placed over a suitable sheet or the like 50 carrying handwriting or other markings, graphs, or the like to be compared or examined for various characteristics, such as slope of writing, size of writing, or pressure of the pen. The transparent film 100 will be adjacent the sheet 50 to be compared and such film will be supported from the sheet 50 only by the thin transparent back window portion 20. Thereupon, successive portions of the film are brought over the handwriting to be compared by rotating one or the other of the knobs 22 or 23 a suitable distance until a portion of the film having markings with characteristics similar to the handwriting or the like on sheet 50 is presented. Having determined one characteristic of the marking on sheet 50, such as slope of writing, the film may then be moved to a next group of characteristics and the sample on the transparent film 100 will be moved until it is brought over the markings on the sheet 50. After the size of handwriting has been noted and the number taken from the chart the film will be moved a little farther to determine other characteristics of the handwriting or other marking on the sheet 50.

Although the invention has been described in detail with reference to the comparison of handwriting it will be obvious that it may also be applied to comparison of fingerprints and the like, and also lends itself to use by oculists or optometrists in making examinations of the eyes. In such application the examining physician or optometrist may seat himself on the opposite side of the testing device from the person whose eyesight is being tested, and the film 100, which in such case will bear letters or markings of various sizes or characteristics to be observed by the patient, will be adjusted by the examining physician and the patient called on to identify the various letters or markings appearing on the transparent film. The advantage of the present device over previous sight testing devices will be apparent since owing to the transparent nature of the film 100 the examining physician will be able to observe the eyes of the patient at the same time the patient is called upon to identify the various markings on the film or roll. Other uses of the device within the scope of the appended claims will suggest themselves to those skilled in the art.

The invention has been described in detail for the purpose of illustration, but it will be obvious that numerous modifications and variations may be resorted to without departing from the spirit of the invention.

I claim:

1. An apparatus of the character described comprising a transparent film having groups of specimen markings thereon for comparison purposes, a pair of spaced spools carrying the film, a frame in which the ends of the spools are rotatably mounted, and means for rotating the spools so as to move the film from one to the other to present different groups of markings to view, said frame being provided with front and rear window portions.

2. An apparatus as set forth in claim 1, wherein the spools are provided with end knobs for turning the spools to move the film.

3. An apparatus of the character described comprising a transparent film having groups of specimen markings thereon for comparison purposes, a pair of spaced spools carrying the film, a frame in which the ends of the spools are rotatably mounted, and means for rotating the spools so as to move the film from one to the other to present different groups of markings to view, the entire frame being transparent.

References Cited in the file of this patent

UNITED STATES PATENTS

| | | |
|---|---|---|
| 177,120 | Harvey | May 9, 1876 |
| 1,254,028 | Coubal | Jan. 22, 1918 |
| 2,494,926 | Baker | Jan. 17, 1950 |